United States Patent Office.

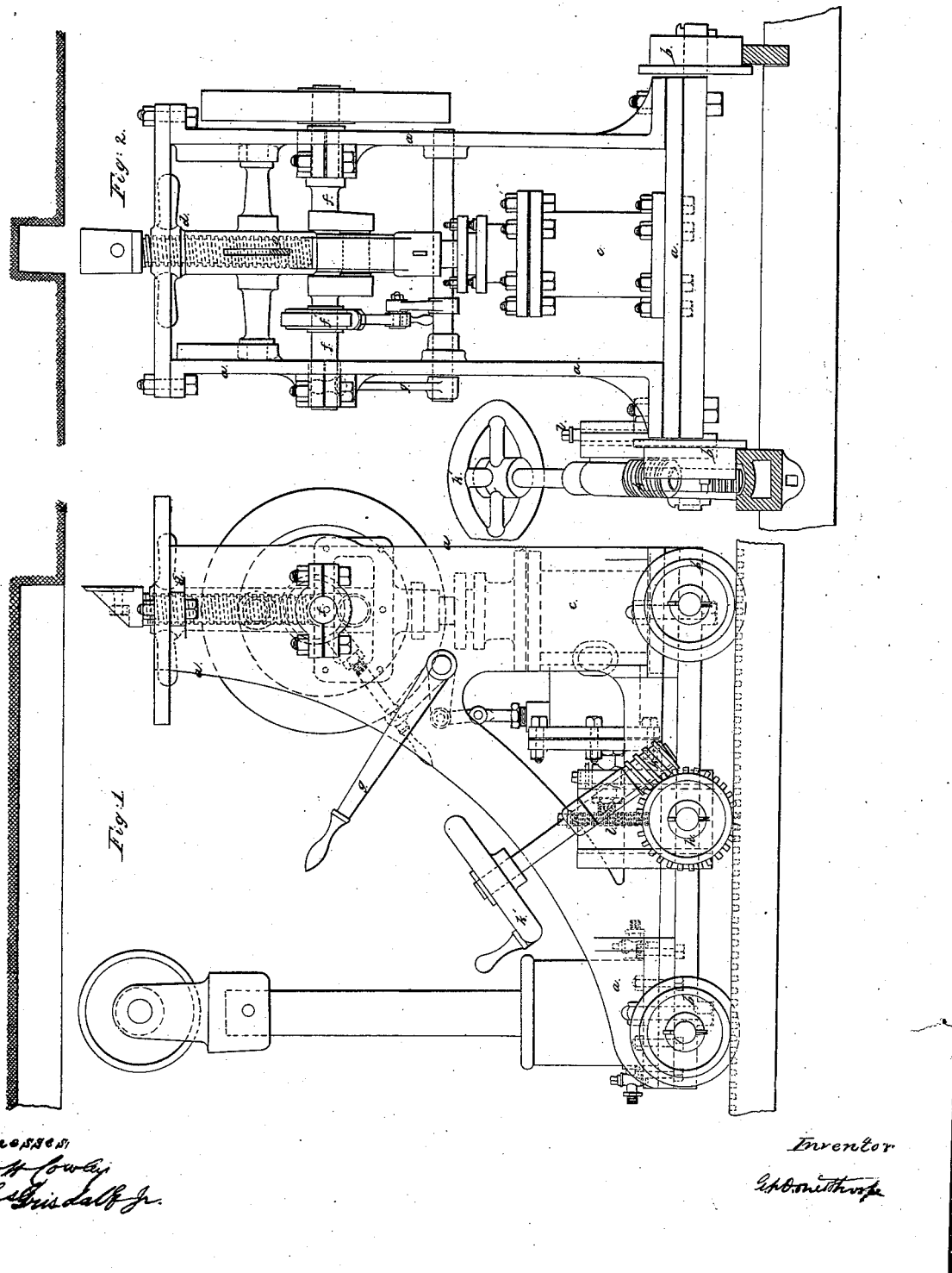

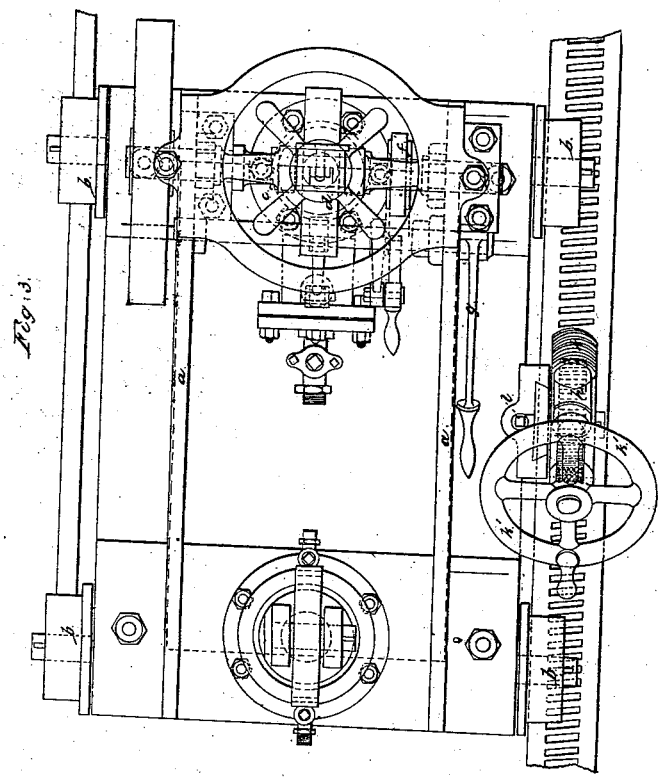

GEORGE EDMUND DONISTHORPE, OF LEEDS, ENGLAND.

Letters-Patent No. 82,391, dated September 22, 1868; patented in England, April 21, 1866

IMPROVED COAL-CUTTING MACHINE.

*The Schedule referred to in these Letters Patent and making part of the same.*

TO ALL TO WHOM IT MAY CONCERN:

Be it known that I, GEORGE EDMUND DONISTHORPE, of Leeds, in the county of York, England, top and nail-manufacturer, a subject of the Queen of Great Britain, have invented or discovered new and useful "Improvements in Getting Coal and other Minerals, and in Machinery Employed for that Purpose;" and I, the said GEORGE EDMUND DONISTHORPE, do hereby declare the nature of the said invention, and in what manner the same is to be performed, to be particularly described and ascertained in and by the following statement thereof; that is to say—

Heretofore it has been proposed to employ machines for cutting grooves, either into or above or below the coal or mineral, to facilitate its being got.

Now, this invention has for its object the steadying-machines employed for cutting such grooves whilst they are at work. For this purpose I, according to one arrangement, first cut into the roof of the mine a shallow groove at a short distance from the face of the coal, that is, being worked and parallel with it, and from this groove in the roof I obtain the requisite holding for steadying the machine, and preventing it from being forced back away from the face of the coal into which the grooves are being cut. Wheels or guides at the top of the machine may, for this purpose, be caused to run in the groove in the roof, or wooden beams or rails may be fixed in the groove, and the requisite holding or steadying of the machine be obtained from these beams or rails. In order to cut the groove in the roof, I employ a truck or carriage, which runs on the rails upon which the machine for cutting the horizontal grooves in the coal is to travel. This truck or carriage carries a cutter, to which a reciprocating to-and-fro motion is, by preference, given, and as the truck moves along the rails, the cutter is caused to form the groove along the roof of the mine, and since an equal length of stroke is at all times given to the cutter, the bottom of the groove in the roof will be parallel with the rails.

A similar machine may be employed for forming grooves in the floor of the mine into which the rails upon which the machine is to run are to be inserted. In some cases, in place of forming a continuous groove along the roof, I bore holes into the roof at intervals apart, and then, in order to steady the cutting-machine when at work, I cause the upper ends of pillars or uprights from the carriage or bed of the machine to be inserted into the holes, and thus hold the carriage fast. In this case the carriage or bed of the machine is formed with slides or guides, upon which the portion of the machine which carries the tool or tools for cutting the grooves into or above or below the coal or mineral, is capable of sliding, in order that they may be moved forward progressively, to enable them to form the groove or grooves. When this sliding portion of the machine has travelled from one end of the bed or carriage to the other, the bed or carriage is moved forward a distance, and is then again held fast by means of fresh holes in the roof.

In the drawings hereunto annexed, I have shown a machine such as is above described, for cutting grooves in the roof of a mine.

Figure 1 shows a side view of the machine,

Figure 2 an end view, and.

Figure 3 a plan.

$a$ is the framing of the truck or carriage, which is supported on wheels $b$, which are to run on the rails upon which the machine used for cutting the grooves into or above or below the seam of coal is to travel. At the front end of the carriage is the cylinder $c$ of a small air-engine. The upper end of the piston-rod of this engine carries the cutter which is to cut the groove into the roof, and in order that this cutter may be raised or lowered to bring it to the proper height for cutting a groove of the desired depth in the roof, the upper end of the piston-rod is made tubular, to receive the stem of the cutter, and a screw-thread is cut on this stem, which screws into a nut, $d$, as shown.

The screw-stem of the cutter is prevented from turning by a feather, $e$, and the nut $d$ has handles upon it by which it can be turned when it is desired to raise or lower the cutter.

In order to work the slide-valve of the engine, the to-and-fro motion of the piston-rod gives a rotary motion to the axis $f$ in the manner shown, and motion is communicated to the valve from an eccentric, $f'$, on this axis; or the slide-valve can be disconnected from the eccentric, and be worked by the hand-lever $j$. The working the valve from an eccentric insures the cutter always cutting to an even depth into the roof, as the cutter ceases to work unless each blow given by it is of sufficient strength to enable it to complete its stroke. As the cutter is being moved to and fro, the truck or carriage is simultaneously slowly moved forward along the rails by a toothed wheel, $h$, gearing with a rack formed in the face of one of the rails. The toothed wheel is for this purpose turned by a worm, $k$, which has on its axis a hand-wheel, $k'$, as shown. The toothed wheel $h$ and worm $k$ are carried by a slide, which can be raised or lowered on the frame of the carriage or truck, by turning the screw $l$. The toothed wheel $h$ can thus be raised out of gear with the rack formed in the face of the rail, when it is desired to shift the machine from place to place. In order to steady the machine when at work, the back of the truck carries an air-cylinder, fitted with a piston or plunger, which carries at its upper end a roller, and the plunger presses this roller against the roof of the mine when the machine is at work.

When a groove has been cut in the roof of a mine, I employ it for steadying the machine, which is to cut a groove or grooves into or above or below the seam of coal, by preference, by causing a strip or feather, carried by the machine to enter the groove and slide along it as the machine moves forward, and by this means I prevent the machine from being driven back away from the face of the coal into which it is cutting a groove or grooves, or in place of this arrangement strips or beams of wood or metal may, as above mentioned, be placed in the groove, and the machine may then be steadied by flanged pulleys, carried by the machine being caused to run on these strips or beams, or other arrangements may be resorted to for steadying the cutting-machine, by a groove in the roof.

When cutting a groove into or above the seam of coal close to the roof of the mine by a machine, the cutting-apparatus of which is carried on the top of the plungers of an air-cylinder, so that the cutting-apparatus is pressed up constantly against the roof of the mine, I, by preference, attach to the frame that carries the cutters, a strip or feather to run in the groove in the roof, and place on each side of this feather rollers, which are to bear against the roof. The groove formed by the cutters will thus follow the line of the roof, and at the same time the machine will be steadied by the feather, which is received into the groove. If such a machine be employed for cutting a groove below the seam of coal, or near to the floor of the mine, then I in a similar manner employ a groove in the floor of the mine to steady the machine.

A machine for cutting grooves into the floor of the mine may be constructed in a similar manner to the machine shown in the drawings for cutting grooves into the roof, and such a machine may also be employed for cutting grooves in the floor, to facilitate the fixing of the rails upon which the cutting-machine is to run.

The cutter shown in the drawings is suitable for cutting grooves; when, however, it is desired to cut holes in the floor or roof, then a suitable boring-tool is employed, and provision is made for giving a partial rotation to the tool after each stroke or blow, as is well understood.

Having thus described the nature of my invention, and the manner of performing the same, I would have it understood that what I claim, is—

1. The combination, substantially as set forth, of the rack on the rail, the geared pinion, the worm, and the hand-wheel, with the lifting-screw $l$, whereby the feeding-devices on the carriage may be released from the rail.

2. The combination, substantially as set forth, of the carriage, the feeding-mechanism, the guiding-mechanism, and the cutting-mechanism, for the purpose set forth.

3. The combination, substantially as set forth, of the carriage, the cylinder, the cutter connected directly with the cylinder, and the mechanism for controlling the induction-valve of the cylinder, whereby the valve is not wholly opened unless the cutter makes a full stroke, and, consequently, the depth of one cut regulates the force applied on the next stroke of the cutters.

4. The combined arrangement of apparatus herein described, for cutting grooves or holes into the floor or roof of a mine.

G. E. DONISTHORPE.

Witnesses:
  W. H. COWLEY,
  THOS. GRISDALE, Jr., } both of Leeds, England.